(12) United States Patent
Gruen et al.

(10) Patent No.: US 8,397,856 B2
(45) Date of Patent: Mar. 19, 2013

(54) POWER-PLANT MOUNTING

(75) Inventors: Sven Gruen, Ditzingen (DE); Jan Hogenmueller, Leonberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 484 days.

(21) Appl. No.: 12/701,714

(22) Filed: Feb. 8, 2010

(65) Prior Publication Data

US 2010/0237220 A1     Sep. 23, 2010

(30) Foreign Application Priority Data

Mar. 19, 2009   (DE) .................... 10 2009 013 944

(51) Int. Cl.
   *B60K 5/12* (2006.01)
(52) U.S. Cl. ....................... 180/291; 180/299
(58) Field of Classification Search ............. 180/291, 180/299, 311, 312
   See application file for complete search history.

(56) References Cited

U.S. PATENT DOCUMENTS

| | | | |
|---|---|---|---|
| 1,867,070 A | 7/1932 | Glascock | |
| 1,896,859 A | 2/1933 | Wylie et al. | |
| 2,079,183 A | 5/1937 | Rondelle | |
| 5,460,238 A * | 10/1995 | Burke et al. | 180/299 |
| 5,788,206 A * | 8/1998 | Bunker | 248/634 |
| 5,788,207 A * | 8/1998 | Bunker | 248/634 |
| 6,349,918 B1* | 2/2002 | Bunker | 248/635 |
| 6,408,974 B1* | 6/2002 | Viduya et al. | 180/312 |
| 7,350,777 B2* | 4/2008 | Ogawa et al. | 267/141.1 |
| 2006/0108725 A1 | 5/2006 | Ogawa et al. | |

FOREIGN PATENT DOCUMENTS

| | | |
|---|---|---|
| DE | 4029228 A1 | 4/1991 |
| JP | 55160616 A | 12/1980 |
| JP | 7117493 A | 5/1995 |
| JP | 2006137205 A | 6/2006 |

* cited by examiner

*Primary Examiner* — John Walters
*Assistant Examiner* — Brian Swenson
(74) *Attorney, Agent, or Firm* — Leydig, Voit & Mayer, Ltd.

(57) ABSTRACT

A power train substantially contains an internal combustion engine and an adjacent gearbox unit is connected to the vehicle body via a power-plant mounting. The gearbox unit is held by way of a rear end on a carrying bracket via fastening devices and is mounted in a supported manner on a crossmember by elastic bearings. The carrying bracket contains a tension stop and a guide device which contains a guide journal which extends vertically into passage openings of the crossmember and has an end-side horizontally oriented stop plate.

9 Claims, 4 Drawing Sheets

POWER-PLANT MOUNTING

CROSS-REFERENCE TO RELATED APPLICATION

This application claims the priority, under 35 U.S.C. §119, of German application DE 10 2009 013 944.3, filed Mar. 19, 2009; the prior application is herewith incorporated by reference in its entirety.

BACKGROUND OF THE INVENTION

Field of the Invention

The invention relates to a power-plant mounting for a power train of a motor vehicle. The power train includes an internal combustion engine and a gearbox unit. The internal combustion engine is held on the vehicle body via at least two engine bearings, and the adjacent gearbox unit is held on the vehicle body via at least one double bearing.

U.S. Pat. No. 2,079,183 discloses a mounting for a power train, in which the mounting contains two bearings which are set against it obliquely. Furthermore, U.S. Pat. No. 1,896,859 discloses a mounting for an internal combustion engine, which mounting has two bearings on a crossmember, which bearings are arranged next to one another and are connected via a bracket. The latter is additionally connected to the crossmember by way of the engine block and a vertical central support.

SUMMARY OF THE INVENTION

It is accordingly an object of the invention to provide a power-plant mounting which overcomes the above-mentioned disadvantages of the prior art devices of this general type, which, in the case of a crash, ensures positive guidance of the power train and of the gearbox unit in the longitudinal direction and, moreover, ensures a defined release of the power train and of the gearbox unit without impeding.

With the foregoing and other objects in view there is provided, in accordance with the invention a power-plant mounting for a power train of a motor vehicle, the power train contains an internal combustion engine and a gearbox unit. The power-plant mounting contains fastening devices, a crossmember having passage openings, elastic bearings, and a carrying bracket having a rear free end holding the gearbox unit via the fastening devices and the carrying bracket is mounted in a supported manner on the crossmember by the elastic bearings. The carrying bracket has a tension stop and guide device. The tension stop and guide device has a guide journal extending vertically into the passage openings of the crossmember and an end-side horizontally oriented stop plate.

The advantages which are mainly achieved by the invention include, in the case of a crash, in particular in the case of an offset crash, positive guidance of the power train and of the gearbox unit being possible by a tension stop and guide device in the case of a rearward displacement of the gearbox unit, and subsequently, after defined ripping off of the tension stop, it being possible for an unimpeded power-plant movement to take place. According to the invention, this is achieved by the gearbox unit being held by way of a rear free end on a carrying bracket via fastening devices and being mounted in a supported manner on a crossmember by elastic bearings, and the carrying bracket containing a tension stop and guide device which contains a guide journal which extends vertically into passage openings of the crossmember and has an end-side horizontally oriented stop plate. This embodiment of the tension stop and guide device on the carrying bracket first achieves positive guidance via the guide journal in the passage openings of the crossmember during a crash, and second a jam-free power-plant movement is possible as a result of the guide journal being ripped off the stop plate in a defined manner.

In particular, there is provision according to the invention for the crossmember to contain a profiled upper and a profiled lower shell with a reinforcing shell lying between them as an insert plate, which reinforcing shell is arranged in the region of the passage openings. The passage openings in the shells extend in each case in the vehicle direction and contain an elongate hole, in which the guide journal of the carrying bracket is arranged in a positively guided manner. In the case of a crash of the vehicle, the guide journal of the carrying bracket is therefore guided forwards and rearwards in the elongate hole of the passage openings in the longitudinal direction of the vehicle, what is known as a passage to the top is not possible before ripping off as a result of the smaller width of the elongate hole with respect to the width of the stop plate.

The guide journal of the carrying bracket penetrates the passage openings of the upper shell, of the lower shell and of the reinforcing shell, and the stop plate is arranged in a free-standing manner between turned-out reinforcing tongues in the passage opening of the lower shell. The stop plate is held via a vertically oriented fastening screw in the guide journal of the tension stop device of the carrying bracket. The arrangement of the stop plate between the reinforcing tongues of the lower shell is selected in such a way that it is arranged in a substantially freestanding manner and the action of the elastic mounting of the drive train is therefore not impaired. In addition, as a result of the fastening of the stop plate with a screw in the guide journal of the carrying bracket, defined ripping off of the fastening screw and/or of the guide journal is to be possible only in the case of a displacement to the rear or a possible transverse displacement of the gearbox unit, with the result that a power-plant movement is no longer impeded.

The stop plate and the carrying bracket in each case have elastic stop elements which lie opposite one another; the elastic stop elements are integrally formed on an elastic sleeve which surrounds the guide journal. As a result of this arrangement of elastic stop elements on the inner side of the upper shell of the crossmember and, lying opposite it, on the inner side of the stop plate and around the guide journal, elastic stop movements on components which lie opposite one another are possible, for example in the case of oscillatory movements which occur.

In particular, there is provision according to the invention for the upper shell and the lower shell to be connected on the edge side to reinforced edges of a central tunnel of the vehicle body, and for the bearings of the carrying bracket to be arranged so as to lie obliquely on both sides of the device, the gearbox unit being connected to the carrying bracket via at least three fastening screws which are arranged around the guide journal of the carrying bracket. This provides a power-plant mounting which, in addition to a mounting of the power train and of the gearbox unit, makes targeted positively guided forward and rearward displacement possible in the case of a crash.

Other features which are considered as characteristic for the invention are set forth in the appended claims.

Although the invention is illustrated and described herein as embodied in a power-plant mounting, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 is an exploded, perspective view of the crossmember, containing an upper shell, a lower shell and a reinforcing shell which lies in between.

DETAILED DESCRIPTION OF THE INVENTION

Figure 1:
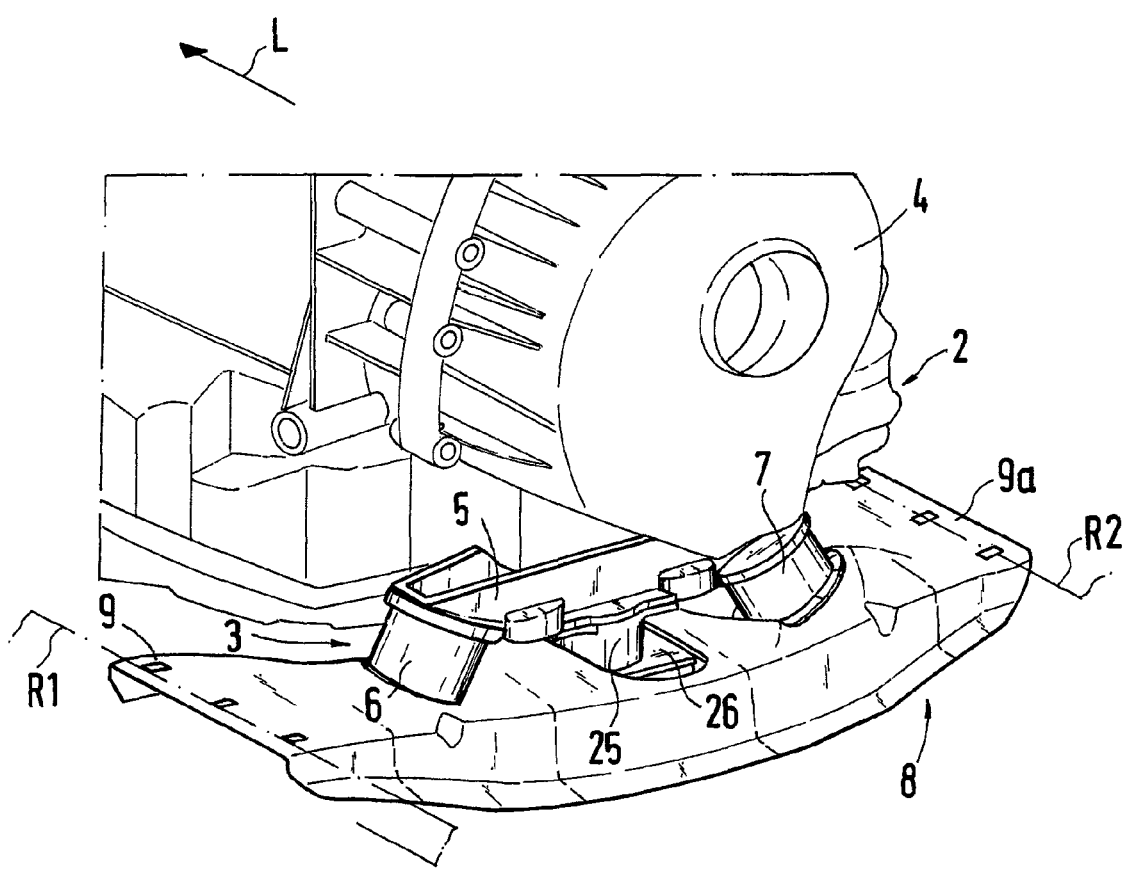
FIG. 1 is a diagrammatic, perspective view of a power-plant mounting with a carrying bracket, a crossmember and a tension stop and guide device according to the invention.

Referring now to the figures of the drawing in detail and first, particularly, to FIG. 1 thereof, there is shown a power-plant mounting 1 for a gearbox unit 2 at a rear end 3 of a gearbox housing 4. The mounting 1 contains substantially a carrying bracket 5 which is connected to the gearbox housing 4 via screw devices S1, S2 and S3 (only center lines shown). The carrying bracket 5 is supported on a crossmember 8 via elastic bearings 6, 7, and the crossmember 8 is connected by way of its free side edges 9, 9a to reinforced edges R1, R2 of a central tunnel of a vehicle body. A tension stop and guide device 10 which contains a guide journal 11 with an end-side stop plate 12 is connected to the carrying bracket 5.

The crossmember 8 contains a profiled upper shell 14, a profiled lower shell 15 and a reinforcing shell 16 which is placed in between as an insert plate. The lower shell 15 is connected at the end side together with the upper shell 14 at the reinforced edge R1, R2 of the central tunnel and to the latter.

Figure 2:
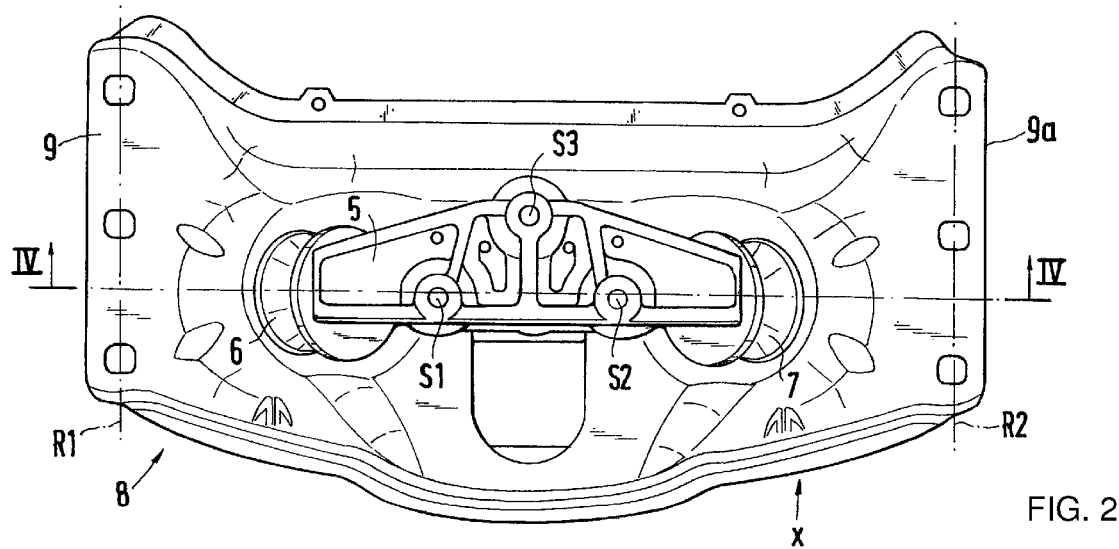
FIG. 2 is a top, plan view of the power-plant mounting.
Figure 3:
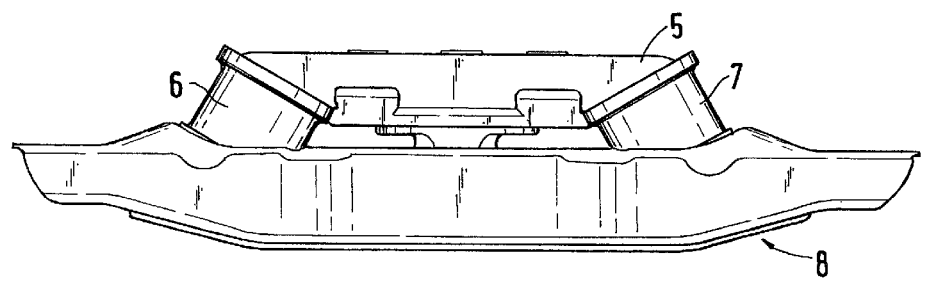
FIG. 3 is a side view of the power-plant mounting, as viewed in the arrow direction X shown in FIG. 2.
Figure 4:
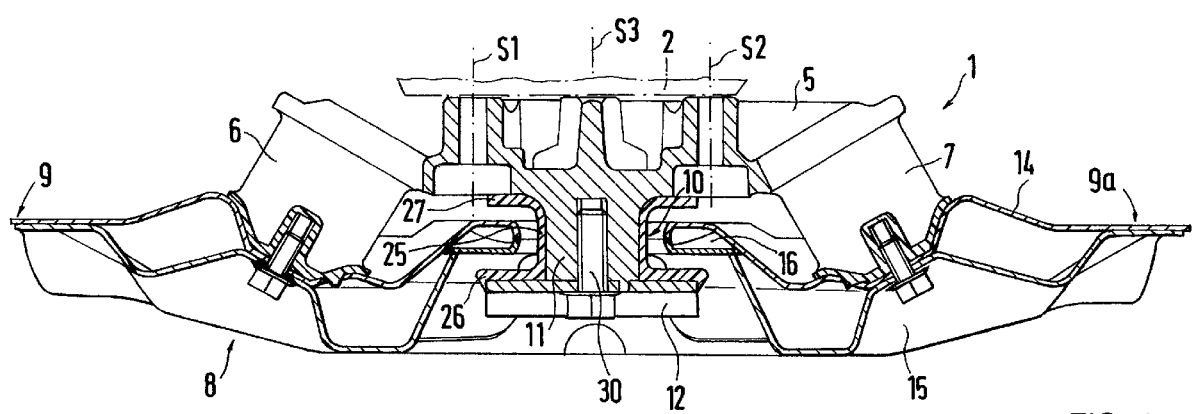
FIG. 4 is a section view taken along the line IV-IV shown in FIG. 2.
Figure 5:
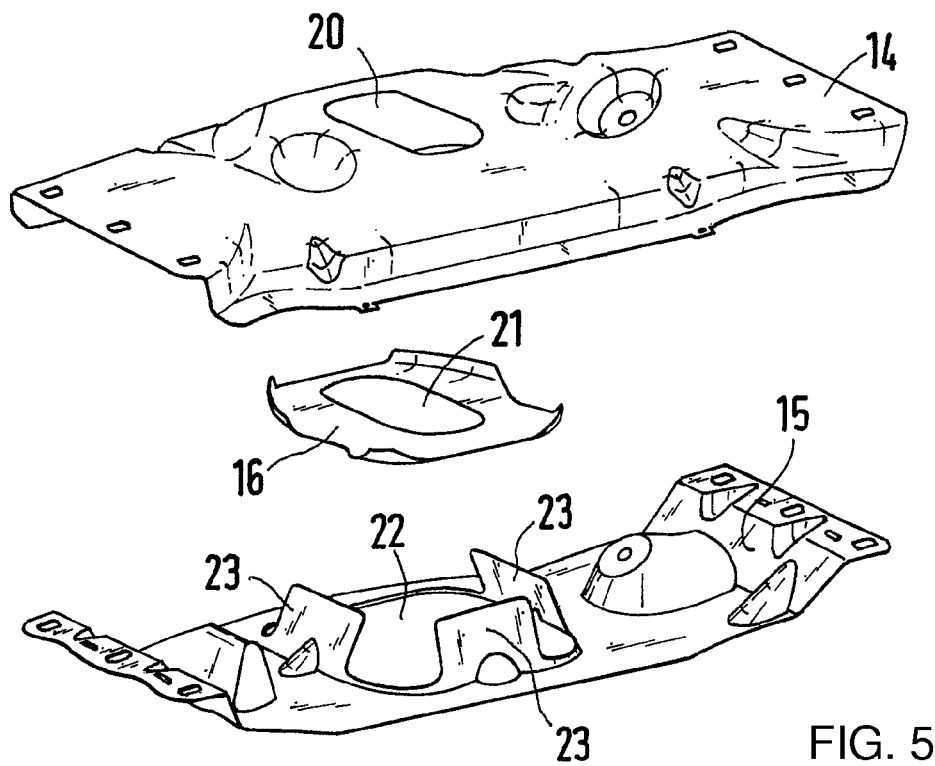
Figure 6:
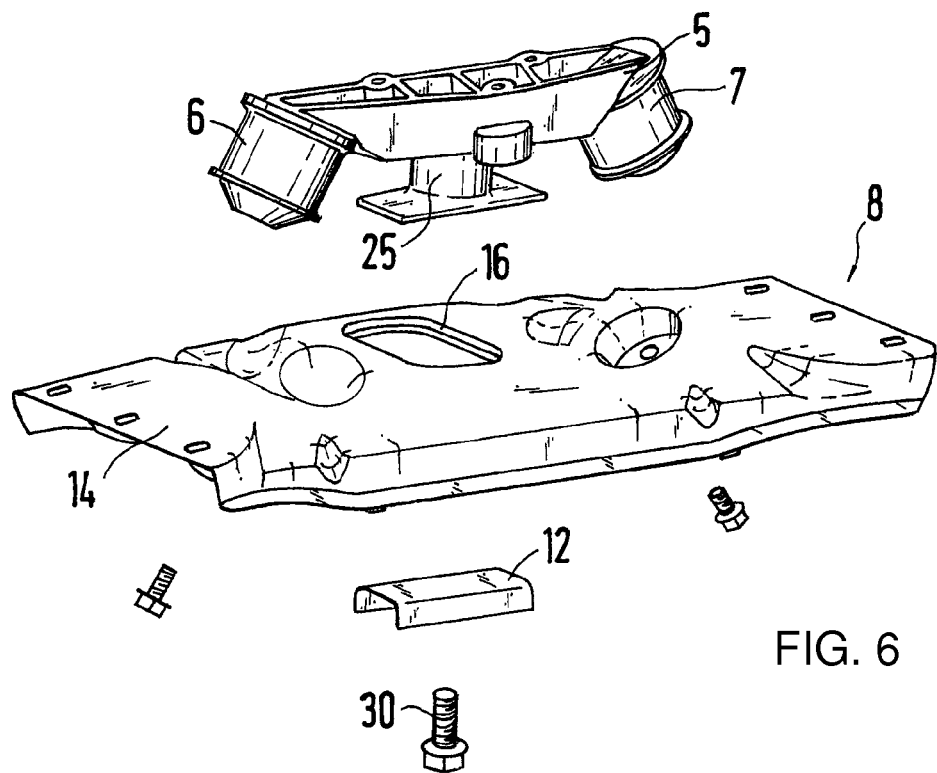
FIG. 6 is an exploded, perspective view of the assembled crossmember with a carrying bracket and a stop plate of the tension stop device.

At free ends, the carrying bracket 5 has the elastic bearings 6 and 7 which are vulcanized onto it, are supported in receptacles of the upper shell 14 of the crossmember 8 (FIG. 2) and are fastened via screws. The tension stop and guide device 10 is arranged on the carrying bracket 5 in the center of the carrying bracket 5 and between the two elastic bearings 6, 7, which tension stop and guide device 10 has the stop plate 12 which is held on the guide journal 11 via a fastening screw 30. The guide journal 11 extends vertically through the passage openings 20, 21, 22 and the stop plate 12 is arranged in a horizontal plane with respect to the guide journal 11.

The guide journal 11 is guided through passage openings 20, 21 and 22 of the shells 14, 16 and 15, the stop plate 12 being arranged in a substantially freestanding manner on the guide journal 11 in the passage openings 22 of the lower shell 15 between turned-out reinforcing tongues 23, which surround the stop plate 12.

The guide journal 11 is guided in the passage openings 20, 21 of the upper shell 14 and the reinforcing shell 16, which passage openings 20, 21 are configured as longitudinal slots or elongate holes which lie congruently above one another and are oriented in a vehicle longitudinal direction L. The longitudinal slots or elongate holes have a width which corresponds approximately to the diameter of the guide journal 11, but have a smaller width than the stop plate 12.

The guide journal 11 has an elastic encapsulation as a sleeve 25, on which in each case, on the end side, elastic stop elements 26, 27 are integrally formed which are provided on the inner side of the stop plate 12 and, lying opposite, on the inner side of the carrying bracket 5.

In the case of a crash, in particular in the case of an offset crash, the power train and the gearbox unit 2 are positively guided rectilinearly via the guide journal 11 at least in the elongate hole of the passage openings 20, 21, until defined ripping off of the guide journal 11 from the carrying bracket 5 takes place as a result of a further rearward displacement or transverse displacement about a vertical axis or rearing up of the gearbox unit, and therefore a possible further power-plant movement is not impeded.

The invention claimed is:

1. A power-plant mounting for a power train of a motor vehicle, the power train containing an internal combustion engine and a gearbox unit, the power-plant mounting comprising:
fastening devices;
a crossmember having passage openings formed therein;
elastic bearings; and
a carrying bracket having a rear free end holding the gearbox unit via said fastening devices and said carrying bracket is mounted in a supported manner on said crossmember by means of said elastic bearings, said carrying bracket having a tension stop and guide device, said tension stop and guide device having a guide journal extending vertically into said passage openings of said crossmember and an end-side horizontally oriented stop plate,
wherein the crossmember contains shells including a profiled upper shell, a profiled lower shell, and a reinforcing shell lying between said profiled timer and lower shells as an insert plate, said reinforcing shell is disposed in a region of said passage openings.

2. The power-plant mounting according to claim 1, wherein said passage openings are formed in said shells and in each case are one or an elongate hole and a longitudinal slot which extends in a vehicle longitudinal direction and in which said guide journal of said carrying bracket is disposed in a positively guided manner.

3. The power-plant mounting according to claim 2, wherein:
said guide journal of said carrying bracket penetrates said passage openings of said profiled upper shell, of said profiled lower shell and of said reinforcing shell;
said profiled lower shell has turned-out reinforcing tongues; and
said end-side horizontally oriented stop plate is disposed in a freestanding manner between said turned-out reinforcing tongues in said passage opening of said profiled lower shell.

4. The power-plant mounting according to claim 3, wherein said elongate hole which extends in the vehicle longitudinal direction is arranged in each ease in said profiled upper shell and in said reinforcing shell as said passage opening, through which said guide journal extends, and a width of said elongate holes is configured to be smaller than one of a width and a length of said end-side horizontally oriented stop plate which is disposed in a freestanding manner between said turned-out reinforcing tongues of said profiled lower shell.

5. The power-plant mounting according to claim 1, wherein said passage openings have a width which corresponds approximately to a diameter of said guide journal and is smaller than one of a width and a length of said end-side horizontally oriented stop plate.

6. The power-plant mounting according to claim 1, further comprising a vertically oriented fastening screw, said end-side horizontally oriented stop plate is held via said vertically oriented fastening screw in said guide journal of said carrying bracket.

7. The power-plant mounting according to claim 1, wherein said profiled upper shell and said profiled lower shell are connected on an edge side to reinforced edges of a central tunnel of a vehicle body, and said elastic bearings are disposed on said carrying bracket so as to lie obliquely on both sides of said tension stop and guide device, and in that the gearbox unit is connected to said carrying bracket via at least three of said fastening devices being fastening screws which are disposed around said guide journal of said carrying bracket.

8. The power-plant mounting according to claim 1, wherein said end-side horizontally oriented stop plate and said carrying bracket in each case have, lying opposite one another, an elastic stop element.

9. The power-plant mounting according to claim 8, further comprising an elastic sleeve surrounding said guide journal, said elastic stop elements are integrally formed on said elastic sleeve.

* * * * *